Oct. 14, 1952 N. CORDIS 2,613,641
AUTOMATIC FLOCK FEEDER
Filed Nov. 29, 1947 2 SHEETS—SHEET 1

INVENTOR
NAT CORDIS
BY Everett A. Johnson
ATTORNEY

Oct. 14, 1952     N. CORDIS     2,613,641
AUTOMATIC FLOCK FEEDER

Filed Nov. 29, 1947     2 SHEETS—SHEET 2

INVENTOR
NAT CORDIS
BY *Everett A. Johnson*
ATTORNEY

Patented Oct. 14, 1952

2,613,641

UNITED STATES PATENT OFFICE 2,613,641

AUTOMATIC FLOCK FEEDER

Nat Cordis, Wilmot, Wis., assignor of one-half to Gerald L. Kitson, Charles H. Kitson, and Leon Kitson, all of Rockford, Mich.

Application November 29, 1947, Serial No. 788,804

20 Claims. (Cl. 119—51)

This invention relates to animal husbandry and more particularly to devices for dispensing pulverant materials. Still more specifically the invention is an improvement in a method and means for supplying feed to trough-type flock feeders.

Flock feeders of the batch trough type are well known. These feeders, however, are of limited capacities of from about five to twelve or fifteen pounds and they usually must be attended for each feeding. This is a considerable disadvantage when large flocks are involved. Further, it is necessary for the handler to enter the feeding area to replenish the supply and this disturbs the flock, frequently having adverse effects upon the egg production and general well-being of the flock due to fright.

It is therefore an object of my invention to provide a flock feeder of greatly increased capacity. A further object is to provide an apparatus in which the supply can be maintained without disturbing the flock. Another object is to provide a method and an automatic means for uniformly distributing an adequate supply of fresh feed within a flock feeder. Still another object is to provide an apparatus which maintains a fresh supply of feed in a trough and avoids clogging with stale feed.

The above and additional objects of my invention will become apparent to those skilled in the art as the description of my invention proceeds with reference to the drawings wherein.

Briefly I attain the objects of my invention by providing a large roomy trough with flanges at the top and a grill or guard to prevent wasteful billing of feed. A plurality of spaced distributor paddles travel on a conveyor through the trough along the bottom thereof and deposit feed on either side of the trough. Ordinarily, the trough will extend the entire length of the poultry shelter and through a wall thereof. A suitable conveyor comprises a sprocket and closed chain arrangement which carries spaced paddles or cleats along the inside of the trough in a repeating cycle.

Figure 1:
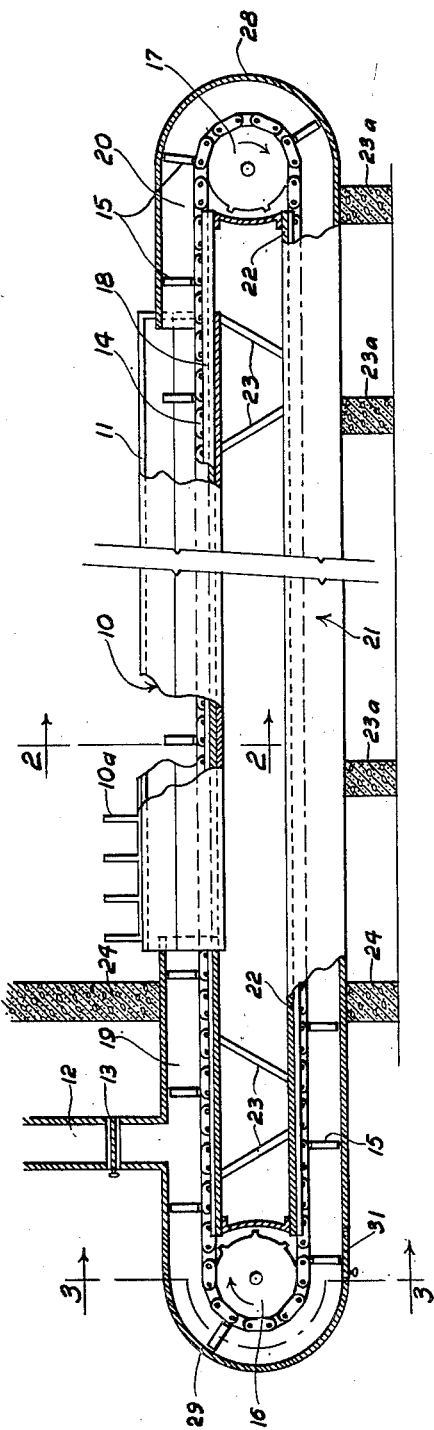
Figure 1 is a schematic elevation partly in section showing the general assembly of parts.

Referring to the drawings, Figure 1 illustrates schematically the general assembly of elements including the trough 10, the flanges 11, the supply bin 12, slide valve 13, the conveyor or carrier 14 and distributor paddles or cleats 15. The carrier 14 may suitably comprise a chain 14, driven sprocket 16 and idling sprocket 17, the chain traveling in recessed riser 18 in the bed of the trough 10. Feed or other pulverant material from the bin 12 is supplied by gravity through slide valve 13 and falls within the channel 19 in the path of the paddles or distributors 15 and moved through the wall 24 and thence within the trough 10 by conveyor 14. The approach channel 19 and withdrawal channel 20 have a cross-section substantially corresponding to that of the distributors 15. Thus in moving through these guide channels 19 and 20 the feed is confined between the adjacent distributors 15 and the walls of channels 19 and 20. A conveyor conduit 21 is disposed below the trough 10 and curves about the sprockets 16 and 17 as shown to provide a closed return conduit for the conveyor assembly. A recessed guide means 22 can be provided within the conveyor conduit 21 for the chain 14. Braces or brackets 23 support the trough 10, conveyor conduit 21, sprockets 16 and 17, and other elements of the assembly in their spaced operable relation.

Figure 2:
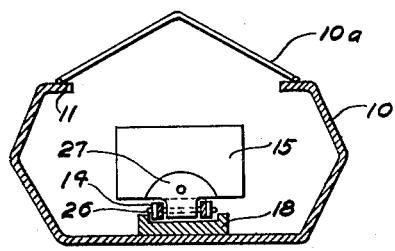
Figure 2 is a view taken along the lines 2—2 in Figure 1 showing details of the distributor-conveyor.

As illustrated in Figure 2 the trough 10 is shaped to provide flanges 11 and the sides thereof are designed to avoid clogging of the feed along the trough edges. The paddle or distributor 15 is mounted on pin 26 in chain conveyor 14 transverse to the normal travel of the conveyor. The lower edge of the distributor 15 travels above the bottom of the trough 10 and may be guided by recessed riser 18. By this means distribution of the feed along the edges of the trough 10 is effected whether or not the feeding area below the flange 11 has been entirely or only partially depleted. By mounting the paddle bracket 27 on the idling pin 26, there is no interference with the paddle or bracket by the teeth of the sprockets 16 or 17 when the conveyor passes thereover.

Figures 3, 4:
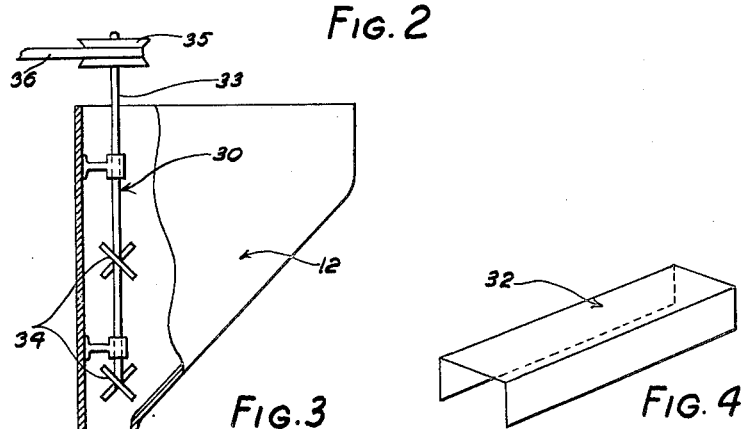
Figure 3 is a fragmentary end view of the apparatus shown partly in section.
Figure 4 is a perspective of a sectional trough by-pass.

In Figure 3 is illustrated the hopper or bin 12, a mixer 30 and the slide valve 13 supported by guide 13a. It is, however, contemplated that a star-feeder (not shown) may be substituted for the slide valve 13. Motor 37 can be provided to drive sprocket shaft 38 through a flexible coupling 39. The pulverant material is discharged into the end of the feed channel 19 in the path of travel of the conveyor-paddle 15 and raised paddles carry the solids within the trough 10, discharging into the feeding areas where the supply is depleted. The conveyor 14 travels over idling pulley or sprocket 17 and returns below the trough 10 through conveyor conduit 21 and over the driven sprocket 16 to repeat the cycle.

In operation of my invention, the supply of pulverant material is introduced into the bin 12 which may be provided with a mixer 30, the illustrated mixer comprising a shaft 33 carrying vanes 34 and driven pulley 35. A quantity of the mixed feed from hopper 12 is discharged by slide valve 13 into the channel 19 through which the conveyor 14 and the distributors 15 travel. The conveyor assembly 14—15 then enters the trough 10, carrying the feed within the elongated trough and depositing it along the edges thereof as needed. After passing through the trough 10 the conveyor enters a closed guide channel 20 and then passes over idling sprocket 17 within housing 28. As described above, a closed conveyor conduit 21 guides the conveyor 14 (and excess feed) back to the driven sprocket 16 enclosed by housing 29 which merges with channel 19. A trap door 31 may be provided along the bottom of conveyor conduit 21 for withdrawing excess feed or for cleaning the assembly. However, in some installations, this door might be provided at some other point along the conduit 21. It is also contemplated that a brush means or resilient paddle of larger cross-sectional area may be fixed to the conveyor 14 for the purpose of sweeping out the assembly. This may be desirable in the event that the apparatus is to be kept in stand-by condition.

Sometimes it is desired to make certain that the supply is not replenished within a given length of the trough 10. In that event a removable guard 32, such as shown in Figure 4, can be placed in the trough. The guard is designed to permit the uninterrupted travel of the conveyor through the trough within the by-pass 32 but to prevent the discharge of feed from between the distributors 15 when passing within that area.

From the above description it will be apparent that I have attained the objects of my invention and have provided an improved automatic or remotely controlled flock feeder having practically an inexhaustable supply of feed. The particular embodiment shown, however, is only for the purposes of illustration and it is not intended to limit my invention except as defined by the appended claims.

What I claim is:

1. A dispenser for pulverant feed material comprising a flanged trough, a driving means at one end of said trough, idling pulley means at the other end of said trough, a conveyor adapted to pass over said driving and idling means longitudinally through said trough, and a plurality of spaced distributor paddle means carried by said conveyor for depositing the pulverant material along the sides of the trough said distributor paddle means having a maximum width and cross-section considerably less than the width and cross-section respectively of said trough.

2. A flock feeder comprising a flanged trough, a driven sprocket, an idling sprocket, a chain adapted to move over said sprockets and pass longitudinally along the floor of said trough, and a plurality of spaced distributor paddle means carried by said chain said distributor paddle means having a maximum width and cross-section considerably less than the width and cross-section respectively of said trough.

3. A flock feeder comprising a flanged trough, a hopper discharging into a channel feeding into one end of said trough, a driven sprocket adjacent one end of said trough, idling sprocket at the other end of said trough, a chain adapted to pass over said sprockets and move longitudinally through said trough, and a plurality of spaced cleats carried by said chain, said cleats being disposed substantially transverse to the direction of travel of said chain and having a maximum width and cross-section considerably less than the width and cross-section respectively of said trough.

4. A dispenser for pulverant material comprising an elongated trough, a storage hopper discharging into a channel feeding into one end of said trough, a conveyor adapted to travel through said trough from end to end, a drive means for said conveyor, and a plurality of spaced distributor means carried by said conveyor and extending transversely to the direction of travel of said conveyor through the trough said distributor means having a maximum width and cross-section considerably less than the width and cross-section respectively of said trough.

5. A flock feeder comprising an elongated trough within a poultry shelter, a channel extending through a wall of said shelter and aligned with an open end of said trough, a feed hopper above the said channel, a drive means mounted adjacent the exposed end of said trough, an idling pulley means at the other end of said trough, a conveyor passing over said drive and idling means, and a plurality of spaced paddle means carried by said conveyor chain and disposed transverse to the direction of motion of said conveyor through the trough said paddle means having a maximum width and cross-section substantially less than the width and cross-section respectively of said trough.

6. A flock feeder comprising an elongated trough within a poultry shelter, a channel extending through a wall of said shelter and aligned with an open end of said trough, a feed hopper discharging into the said channel, a drive sprocket mounted adjacent the exposed end of said trough, an idling sprocket at the other end of said trough, a conveyor chain passing over said sprockets and through said trough, and a plurality of transverse cleats spaced along said conveyor chain, the upper edge of said cleats extending a distance equal to at least one-half the depth of the trough and the width of said cleats being substantially less than the width of said trough.

7. A stock feeder comprising a hopper having a discharge outlet, conduit means communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough and having a maximum width and cross section considerably less than the width and cross section respectively of said trough, and driving means operatively associated with said distributing means for advancing said distributing means through said conduit means.

8. A stock feeder comprising a hopper having a discharge outlet, endless conduit means communicating with said discharge outlet, said conduit means comprising an open-top horizontal trough affording access by stock to feed contained therein, endless flexible conveyor means extending substantially throughout said conduit means and adjacent the bottom of said trough for conveying feed from said hopper, distributing means carried by said conveyor for depositing said feed substantially throughout the length of said trough, said distributing means having a maximum width and cross-section considerably less than the width and cross-section respectively of said trough, and driving means operatively associated with said conveyor means for advancing said distributing means through said endless conduit means.

9. A stock feeder comprising a hopper having a discharge outlet, endless conduit means communicating with said discharge outlet, said conduit means comprising an open-top horizontal trough affording access by stock to feed contained therein and an enclosed channel, endless flexible conveyor means extending substantially throughout said conduit means and adjacent the bottom of said trough, distributor means fixed to said conveyor means for conveying feed from said hopper and distributing said feed substantially throughout the length of said trough, said distributor means having a maximum width and cross-section considerably less than the width and cross-section respectively of said trough and said enclosed channel having a cross-section shape and area corresponding substantially to that of the distributor means, and driving means operatively associated with said conveyor means for advancing said distributing means through said endless conduit means.

10. A stock feeder comprising an open-top horizontal trough affording access by stock to feed contained therein, an enclosed conduit means communicating with the ends of said trough, endless flexible conveyor means extending substantially throughout the length of said trough and said conduit means and carrying distributing means for depositing said feed substantially throughout the length of said trough and recycling excess feed through said conduit means, said distributing means having a maximum width and cross-section considerably less than the width and cross-section respectively of said trough but substantially equal to the dimensions of the enclosed conduit, and driving means operatively associated with said conveyor means for advancing said distributing means through said trough and conduit means.

11. A stock feeder comprising a hopper having a discharge outlet, conduit means communicating with said discharge outlet, said conduit means comprising a plurality of open-top, horizontal troughs connected in series and affording access by stock to feed contained therein, endless flexible distributing means extending substantially throughout said conduit means adjacent the bottom thereof for conveying feed from said hopper and distributing said feed substantially throughout the length of said troughs and having a maximum width and cross section considerably less than the width and cross section respectively of said troughs, and driving means operatively associated with said distributing means for advancing said distributing means through said conduit means.

12. A stock feeder comprising a hopper having a discharge outlet; endless conduit means communicating with said discharge outlet, said conduit means having a medial axis lying in a single plane and comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough and having a maximum width and cross section considerably less than the width and cross section respectively of said trough, and driving means operatively associated with said distributing means for advancing said distributing means through said conduit means.

13. A stock feeder comprising a hopper having a discharge outlet, continuous conduit means formed in a closed circuit communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, and driving means operatively associated with said distributing means for advancing said distributing means through said conduit means.

14. A stock feeder comprising a hopper having a discharge outlet, continuous conduit means formed in a closed circuit communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough and having a maximum width and cross section substantially less than the width and cross section respectively of said trough, and driving means operatively associated with said distributing means for advancing said distributing means through said conduit means.

15. A stock feeder comprising a hopper having a discharge outlet, continuous conduit means formed in a closed circuit communicating with said discharge outlet, said conduit means comprising an open-top horizontal trough affording access by stock to feed contained therein, endless flexible distributing means traversing at least a portion of the bottom of said hopper and extending substantially throughout said conduit means adjacent the bottom thereof for conveying feed from said hopper and distributing said feed substantially throughout the length of said trough, said distributing means having a maximum cross section substantially less than the cross section of said trough, and driving means operatively associated with said distributing means for advancing said distributing means through said conduit means.

16. A stock feeder comprising a hopper having a discharge outlet, continuous conduit means formed in a closed circuit communicating with said discharge outlet, said conduit means comprising an open-top horizontal trough affording access by stock to feed contained therein, at least one endless chain comprised of substantially flat links and extending substantially throughout said conduit means adjacent the bottom thereof for conveying feed from said hopper and distributing said feed substantially throughout the length of said trough, said distributing means having a maximum cross section substantially less than the cross section of said trough, and driving means operatively associated with said distributing means for advancing the distributing means through said conduit means.

17. A stock feeder comprising a hopper having a discharge outlet, continuous conduit means defining a closed circuit communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than the cross section of said trough, sprocket means adapted to receive said flexible distributing means, and driving means operatively associated with said distributing means for advancing said distributing means through said conduit means.

18. A stock feeder comprising a hopper having a discharge outlet, a rotary agitator supported in said hopper, continuous conduit means formed in a closed circuit communicating with said discharge outlet, said conduit means comprising an open-top horizontal trough affording access by stock to feed contained therein, endless flexible distributing means extending substantially throughout said conduit means adjacent the bottom thereof for conveying feed from said hopper and distributing said feed substantially throughout the length of said trough, said distributing means having a maximum cross section substantially less than a section of said conduit, and driving means operatively associated with said distributing means for advancing said distributing means through said conduit means.

19. A flock feeder comprising a flanged trough means, a driven sprocket, an idling sprocket, and an endless chain distributor means adapted to move about said sprockets and pass along the length of said trough means, said chain distributor means having a maximum width and cross-section considerably less than the width and cross-section respectively of said trough means.

20. A flock feeder comprising a flanged trough, a hopper discharging into said trough, a drive sprocket adjacent one end of said trough, an idling sprocket at the other end of said trough, and an endless chain distributor means adapted to engage said sprockets and move longitudinally through said trough, said chain distributor means having a maximum width and cross-section considerably less than the width and cross-section respectively of said trough.

NAT CORDIS.

REFERENCES CITED

The following references are of record in the file of this patent:

UNITED STATES PATENTS

| Number | Name | Date |
|---|---|---|
| 238,637 | Blevin | Mar. 8, 1881 |
| 460,202 | Eberhardt | Sept. 29, 1891 |
| 669,718 | Whittemore | Mar. 12, 1901 |
| 691,439 | Campbell | Jan. 21, 1902 |
| 804,057 | Scott | Nov. 7, 1905 |
| 2,043,595 | Raymond | June 9, 1936 |
| 2,158,093 | Teske | May 16, 1939 |
| 2,158,094 | Teske | May 16, 1939 |
| 2,302,314 | Haggart | Nov. 17, 1942 |
| 2,324,446 | Webb | July 13, 1943 |

FOREIGN PATENTS

| Number | Country | Date |
|---|---|---|
| 515,102 | Great Britain | Nov. 27, 1939 |